T. F. BINGHAM.

Device for Destroying Insects by Fumigation.

No. 8,326. Reissued July 9, 1878.

WITNESSES:

C. Neveux

C. Sedgwick

INVENTOR:

T. F. Bingham

BY Munn & Co

ATTORNEYS.

N. PETERS, PHOTO-LITHOGRAPHER, WASHINGTON, D. C.

UNITED STATES PATENT OFFICE.

TRACY F. BINGHAM, OF ABRONIA, MICHIGAN.

IMPROVEMENT IN DEVICES FOR DESTROYING INSECTS BY FUMIGATION.

Specification forming part of Letters Patent No. 199,611, dated January 29, 1878; Reissue No. 8,326, dated July 9, 1878; application filed May 14, 1878.

*To all whom it may concern:*

Be it known that I, TRACY F. BINGHAM, of Abronia, in the county of Allegan and State of Michigan, have invented a new and Improved Bee-Smoker, of which the following is a specification:

My invention has for its object to furnish an improved apparatus for smoking bees and for other purposes; and it consists of a cylindrical stove provided with a tapering nozzle and a central perforated fire-plate, and which is attached to the top of a small bellows in such a manner as to receive a blast through a small pipe leading from the said bellows into a conically-depressed portion of the stove, for forcing the smoke through the tapering nozzle for fumigating purposes, all as will be hereinafter more fully described, and pointed out in the claims.

Figure 1:
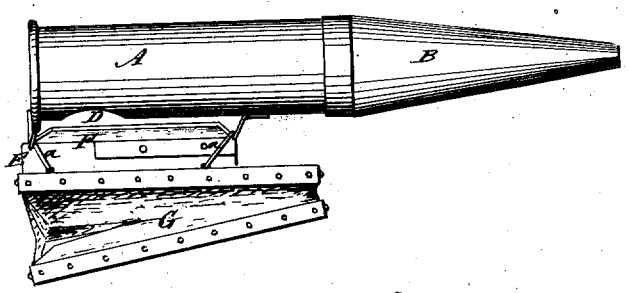
Figure 2:
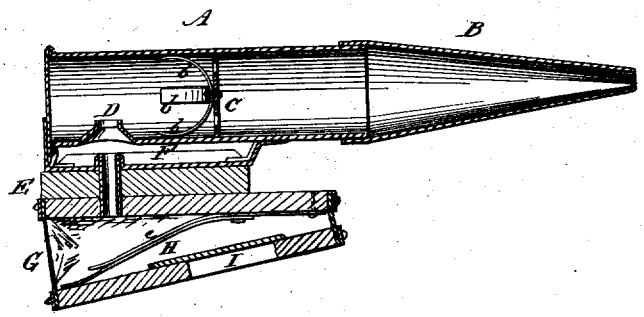

Referring to the drawings, Figure 1 is a side elevation of my improved apparatus. Fig. 2 is a vertical longitudinal section thereof.

Similar letters of reference indicate corresponding parts.

In the drawings, A represents a cylindrical or other suitably-shaped stove, constructed of sheet metal, preferably, and provided with a tapering nozzle, B, and having a perforated fire-plate, C, located at or near the center, the rear or lower end of the said stove being provided with an opening, D, which substantially represents a cone-shaped tube, projecting or pointing into the air-chamber in the rear of the perforated plate C, the object of which is such as to furnish the natural supply of air, and at the same time to prevent the escape of cinders or ashes from the fire to the bellows.

The stove thus constructed is attached to the block E at the top of the bellows by means of the wires *a a*, which pass through suitable holes in the said block, and then over the shield-plate F, which is attached to the under side of the stove to protect the hand of the operator and the bellows from the heat of said stove.

G represents the bellows, which is preferably constructed of a rectangular shape, with a broad top and bottom, so as to afford a wide base for the support of the stove, and, further, to supply a large volume of air to the same by the restricted movement of said bellows, which adds greatly to the ease of manipulating the same, said bellows being provided with one or more suitable flat springs, H, and a spring-valve, I, which admits air readily to the bellows and closes quickly, thereby preventing the escape of air through the valve-aperture. The top and bottom of the bellows are separated a short distance at the hinge end thereof to make room for the valve and springs contained by the bellows.

It will be observed that an open space is left between the exhaust-nozzle of the bellows and the cone-shaped opening of the stove, the object of which is such as to allow the air to pass freely to both the stove and the bellows, and at the same time to enable the air to be forced into the stove to project the smoke in the direction desired. This construction also enables me to dispense with the valve in the bottom of the bellows G, if deemed preferable, as the bellows would be amply supplied with air from the exhaust-nozzle.

It will also be observed that the perforated fire-plate C is adjusted within the cylindrical stove by means of bent springs *b*, which are riveted or otherwise suitably secured at their centers to the center of said plate, while the outer ends project so as to bear against the sides of the stove to hold the plate at any desired point, as also to permit of its ready removal for cleaning the stove.

The spring H, used in the body of the bellows G, is preferably formed of a half-elliptical flat piece of metal, secured at one end to the inside top or bottom of the bellows by a flat staple, and by a screw or nail passing through the same, said spring being provided with a strengthening-piece, *e*, as shown, the free end of the spring H being curved, so as to press or bear smoothly upon the opposite portion of the bellows.

The construction of my invention being as already described, it will be observed that in the operation of the same a mass of burning charcoal or dead rotten wood, to create a smoke, is placed in the stove upon the plate C, and a suitable fumigating substance, if desired, such as sulphur or tobacco, placed upon the fire, and the nozzle B having been placed in position, the fumes of the burning substance are forced out of the end of the same by working the bellows G upon the object to be fumigated.

My invention is adapted for smoking of bees in the management of the same, and for fumigating insects on plants, and combines in its construction and operation a high degree of simplicity and utility with a ready adaptation to the purposes intended.

Having thus described my invention, I claim as new and desire to secure by Letters Patent—

1. The herein-described fumigating apparatus, consisting of the stove A, having cone-shaped opening D, and provided with the tapering nozzle B, perforated fire-plate C, and shield F, the several parts being adapted for operation in connection with the bellows G, substantially as and for the purpose specified.

2. The combination of the stove A, having cone-shaped opening D, and provided with tapering nozzle B, perforated fire-plate C, and shield F, with the block E and bellows G, provided with the springs H and valve I, and exhaust-nozzle, substantially as and for the purpose specified.

3. The combination of the stove A, provided with the cone-shaped opening D and shield F, with the block E and exhaust-nozzle of the bellows G, substantially as and for the purpose specified.

4. The combination of a stove and bellows, substantially as described, the air-inlet of the former being separated by an open space from the air-outlet of the latter, as and for the purpose specified.

TRACY F. BINGHAM.

Witnesses:

O. E. GOODRICH,

PATROCNUS A. LATTA.